Sept. 18, 1962 I. W. ALCORN ETAL 3,054,267

METHOD OF AND MEANS FOR LAUNCHING AND ERECTING OFFSHORE STRUCTURES

Filed May 29, 1957 9 Sheets-Sheet 1

Irwin W. Alcorn
John R. Graham
Lowell B. Christenson
INVENTORS

BY James F. Weiler
Jefferson D. Giller &
William A. Stout
ATTORNEYS

Irwin W. Alcorn
John R. Graham
Lowell B. Christenson
INVENTORS
BY James F. Weiler, Jefferson D. Giller & William A. Stout
ATTORNEYS Sept. 18, 1962 I. W. ALCORN ETAL 3,054,267

METHOD OF AND MEANS FOR LAUNCHING AND ERECTING OFFSHORE STRUCTURES

Filed May 29, 1957 9 Sheets-Sheet 3

Irwin W. Alcorn
John R. Graham
Lowell B. Christenson
INVENTORS

BY James F. Wilen
Jefferson D. Giller &
William A. Stout
ATTORNEYS

Irwin W. Alcorn
John R. Graham
Lowell B. Christenson
INVENTORS

BY James F. Weiler
Jefferson O. Hiller &
William A. Stout
ATTORNEYS

Irwin W. Alcorn
John R. Graham
Lowell B. Christenson
INVENTORS
BY James F. Weiler
Jefferson D. Giller &
William A. Stout
ATTORNEYS Sept. 18, 1962 — I. W. ALCORN ETAL — 3,054,267

METHOD OF AND MEANS FOR LAUNCHING AND ERECTING OFFSHORE STRUCTURES

Filed May 29, 1957 — 9 Sheets-Sheet 6

Irwin W. Alcorn
John R. Graham
Lowell B. Christenson
INVENTORS

BY James F. Weiler, Jefferson D. Giller & William A. Stout

ATTORNEYS

METHOD OF AND MEANS FOR LAUNCHING AND ERECTING OFFSHORE STRUCTURES

Filed May 29, 1957 9 Sheets-Sheet 7

Irwin W. Alcorn
John R. Graham
Lowell B. Christenson
INVENTORS

BY James F. Weiler
Jefferson D. Giller &
William A. Stout
ATTORNEYS

Irwin W. Alcorn
John R. Graham
Lowell B. Christenson
INVENTORS

BY James F. Weiler,
Jefferson D. Giller &
William A. Stout

ATTORNEYS

Sept. 18, 1962 I. W. ALCORN ETAL 3,054,267

METHOD OF AND MEANS FOR LAUNCHING AND ERECTING OFFSHORE STRUCTURES

Filed May 29, 1957 9 Sheets-Sheet 9

Irwin W. Alcorn
John R. Graham
Lowell B. Christenson
INVENTORS

BY James F. Weiler,
Jefferson D. Giller &
William A. Stout
ATTORNEYS 3,054,267

METHOD OF AND MEANS FOR LAUNCHING AND ERECTING OFFSHORE STRUCTURES

Irwin Wyland Alcorn, Houston, and John R. Graham and Lowell B. Christenson, Pasadena, Tex., assignors, by mesne assignments, of 32.88 percent to Petroleum Mortgage Company, a corporation of Texas; 32.88 percent to Belco Petroleum Corporation, a corporation of Delaware; 1.36 percent to Victory Oil Company, a corporation of Delaware; 32.88 percent to The Texstar Corporation, San Antonio, Tex., a corporation of Delaware Filed May 29, 1957, Ser. No. 662,403
6 Claims. (Cl. 61—46.5)

Figures 1, 2:
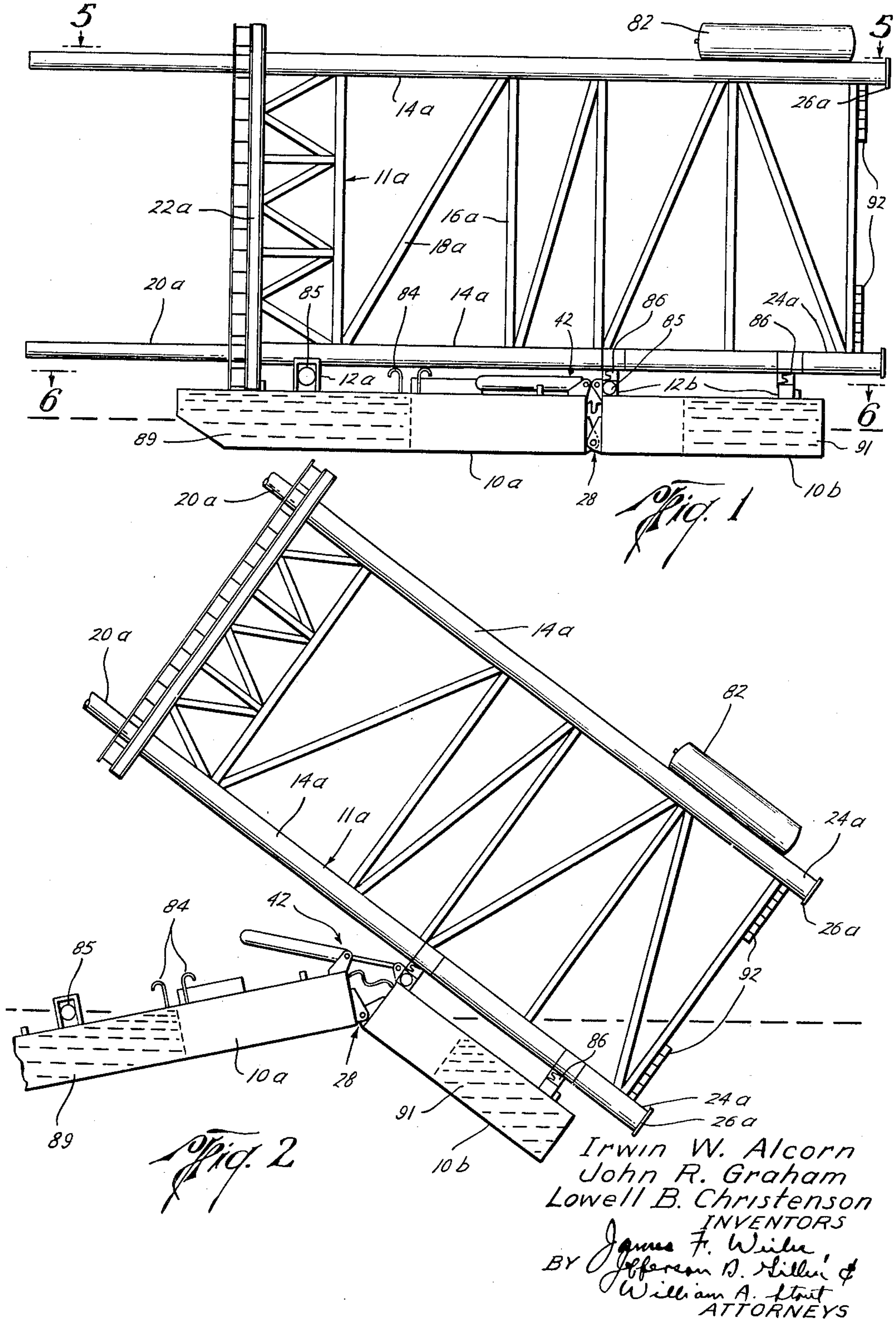

The present invention relates to a method of and means for launching and erecting offshore structures. The present invention is particularly adapted for use in offshore drilling and producing of oil and gas wells and the like although the invention may be used for other purposes.

A considerable amount of offshore drilling and producing of oil, gas and like wells have been done on permanent structures fastened with piling to the floor of a body of water. These have been referred to in the trade as "jacket structures." Ordinarily, piling, generally in the form of tubular hollow steel, is driven into the ocean floor as required to provide the necessary foundation and bearing of the jacket structure to resist the lateral and vertical forces imposed thereon by wind, waves, drilling and other structures and operations.

A complete jacket structure of this type, including piling, for medium depths of water, for example about fifty feet to about sixty feet, weighs from about six hundred to about eight hundred tons and is vary large and bulky. Because of the weight and size of such jacket structures, the present practice is to erect them in sections, ordinarily a minimum of two sections. These sections are transported to the location as deck cargo on barges and are picked up and set in place with large derrick barges. Ordinarily, the derrick barges are used as a base from which the balance of the construction and welding of the jacket structure is done as well as driving the piling for anchoring the structure to bottom. The use of derrick barges is very expensive and the large size of their lifting equipment is only required to or three times during the entire erection of the jacket structure.

It would be highly advantageous to provide a method of and means for erecting a jacket or offshore structure and a jacket or offshore structure which may be erected without the use of derrick barges and in which a minimum of construction and other work are necessary at the location.

It is therefore an object of the present invention to provide a method of launching and erecting an offshore structure and such an offshore structure assembly in which a minimum amount of construction is required at the erection location.

It is yet a further object of the present invention to provide a method of launching and erecting an offshore structure and such an offshore structure assembly in which a prefabricated offshore structure is floated to the erection site on one or more barges, the structure is then rotated until the bottom of the structure is pointing generally downwardly and thereafter the structure is anchored on bottom.

Yet a further object of the present invention is the provision of a method of launching and erecting an offshore structure and such an offshore structure in which the offshore structure is essentially prefabricated having pilings in place and is floated to the erection location in a generally horizontal position, rotated until its bottom is pointing generally downwardly and then driving the pilings into the bottom of the body of water thereby anchoring the structure.

Yet a further object of the present invention is the provision of a method of launching and erecting an offshore structure and such a structure in which the structure having pilings in position are floated to the erection location by at least a pair of barges, and in which one of the barges is rotated downwardly thereby rotating the bottom of the structure downwardly into a generally vertical position, and in which the pilings are then driven into place thereby anchoring the structure to the bottom of the body of water.

Still a further object of the present invention is the provision of such a method of launching and erecting an offshore structure and such an offshore structure in which the offshore structure is launched and erected by relatively light winches and rigging, the structure set in place by means of the barges utilized to float it to the erection location and in which the balance of work required to anchor the offshore structure into position may be accomplished by relatively light equipment, for example, a crane mounted on the drilling tender.

Still a further object of the invention is the provision of at least a pair of barges hinged together and including means for causing movement of an end of one of the barges downwardly so that the bottom of the offshore structure carried thereby is directed downwardly.

A still further object of the invention is the provision of a method of launching and erecting an offshore structure and an offshore structure which is simple and relatively inexpensively operated and constructed and which may be floated to locations and erected and yet which is efficiently reliable in use.

A still further object of the invention is the provision of a method and means for launching and erecting an offshore structure which utilizes the available forces of buoyancy and displacement of water, including ballasting for proper balance, and supplemental pontoons, where necessary or desirable, so that the control mechanism will be subjected to a minimum of force during the launching.

Figure 3:
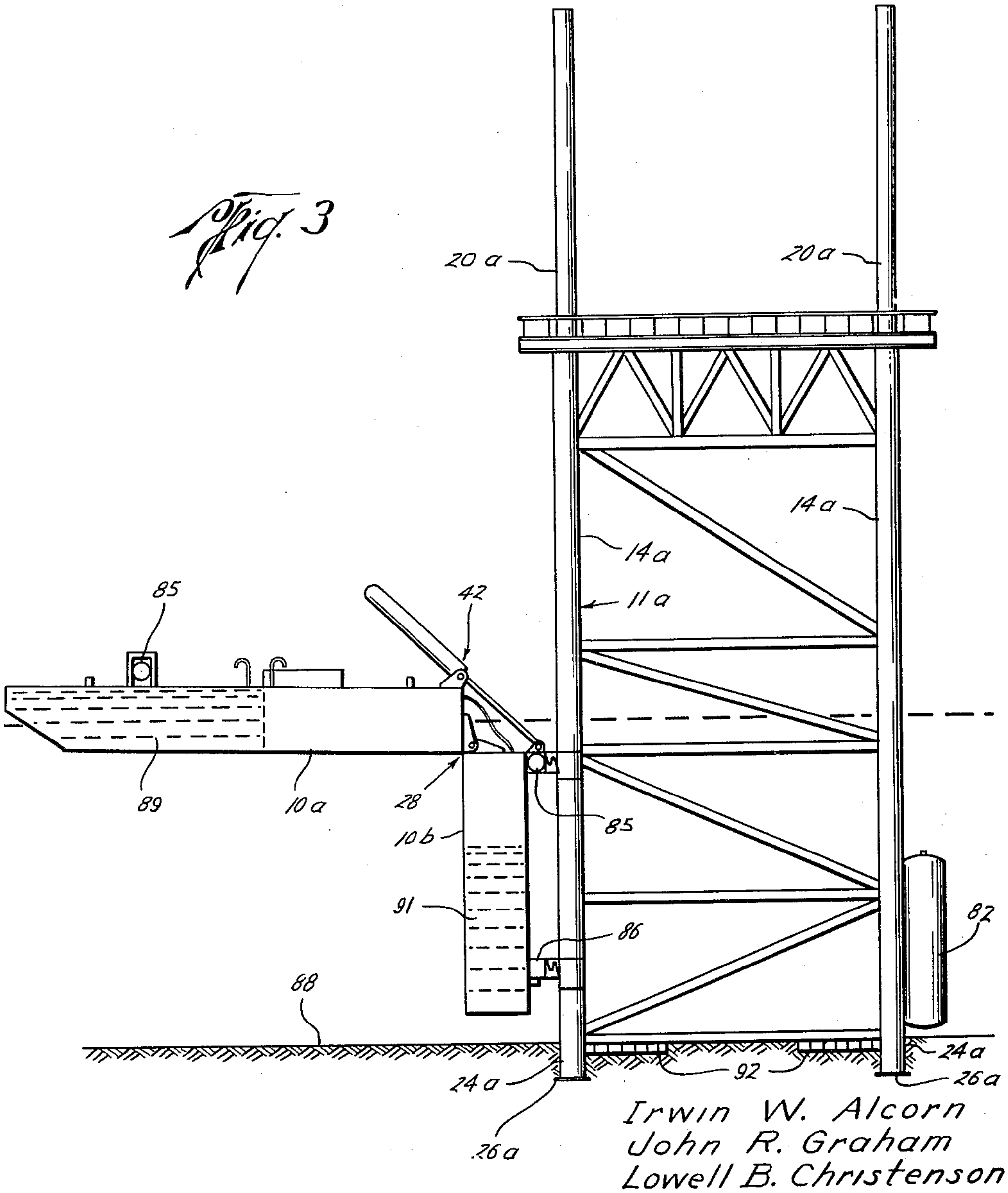
Figure 4:
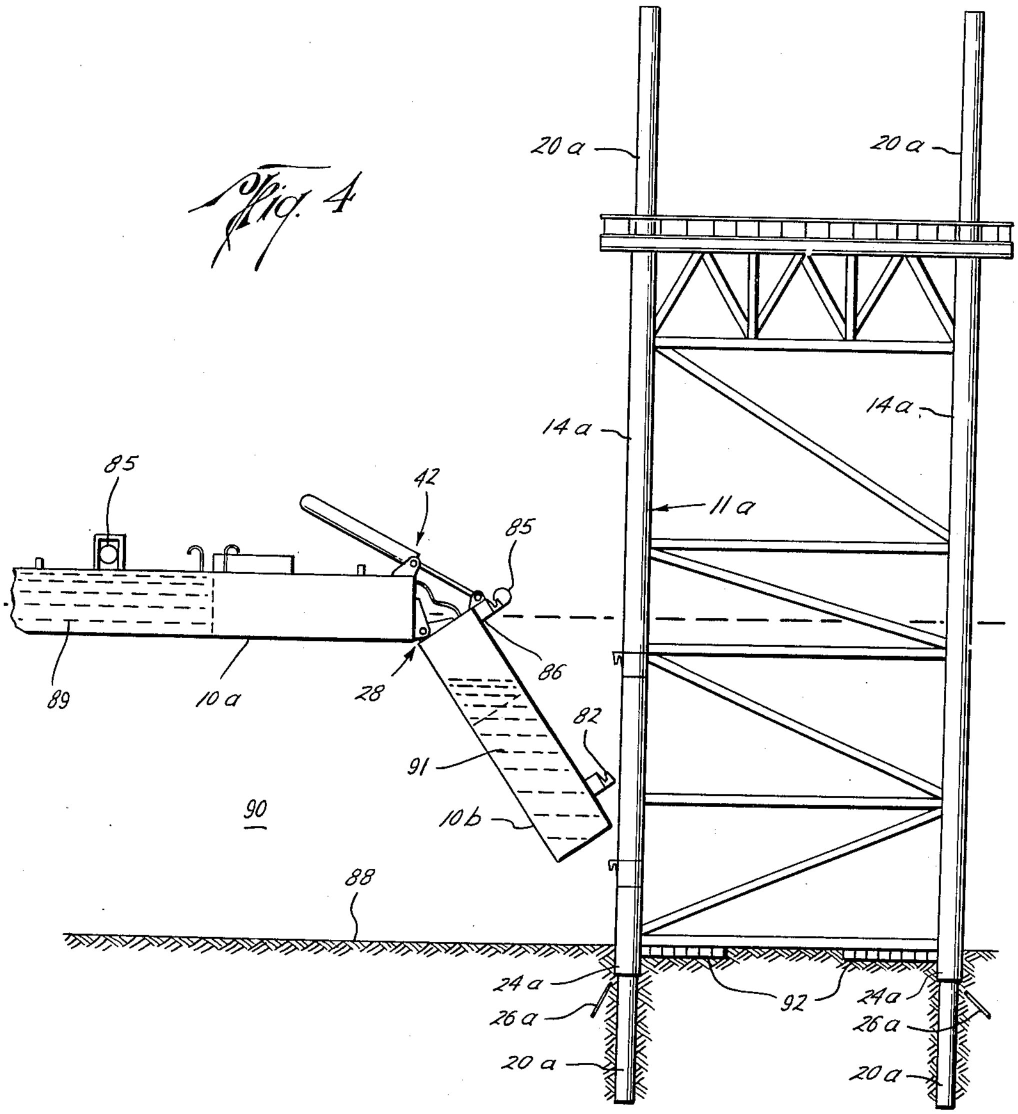
Figure 5:
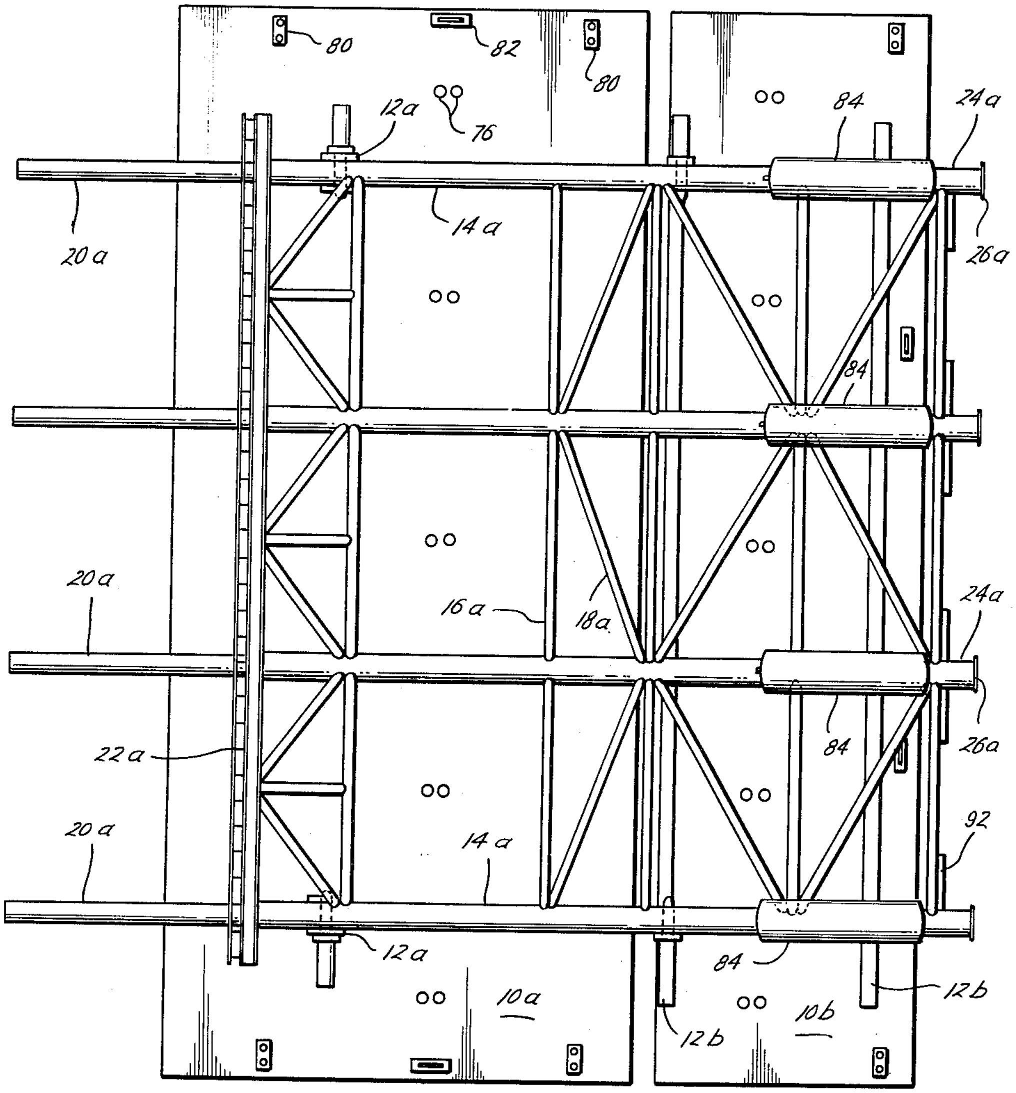
Figures 6, 9:
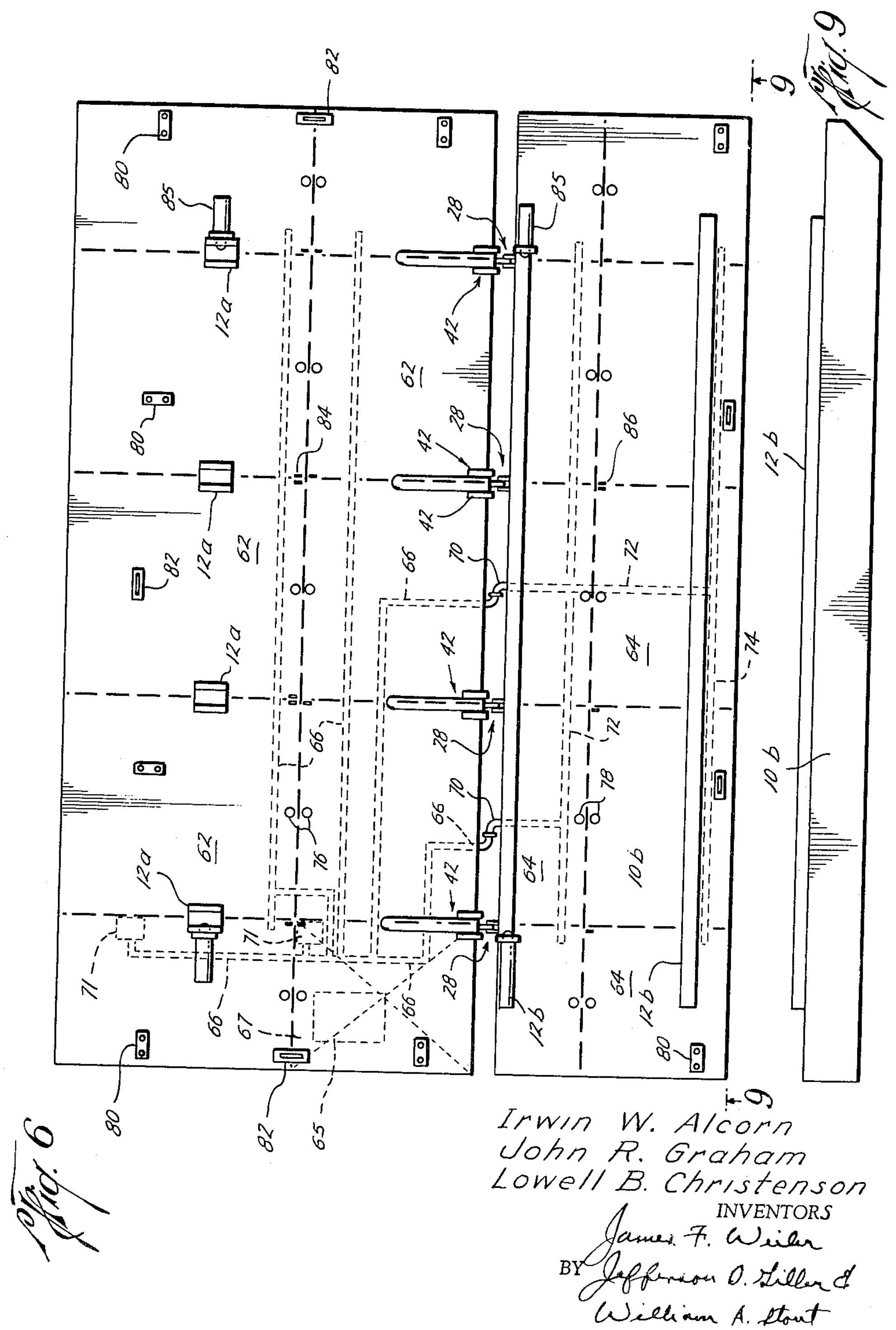
Figure 7:
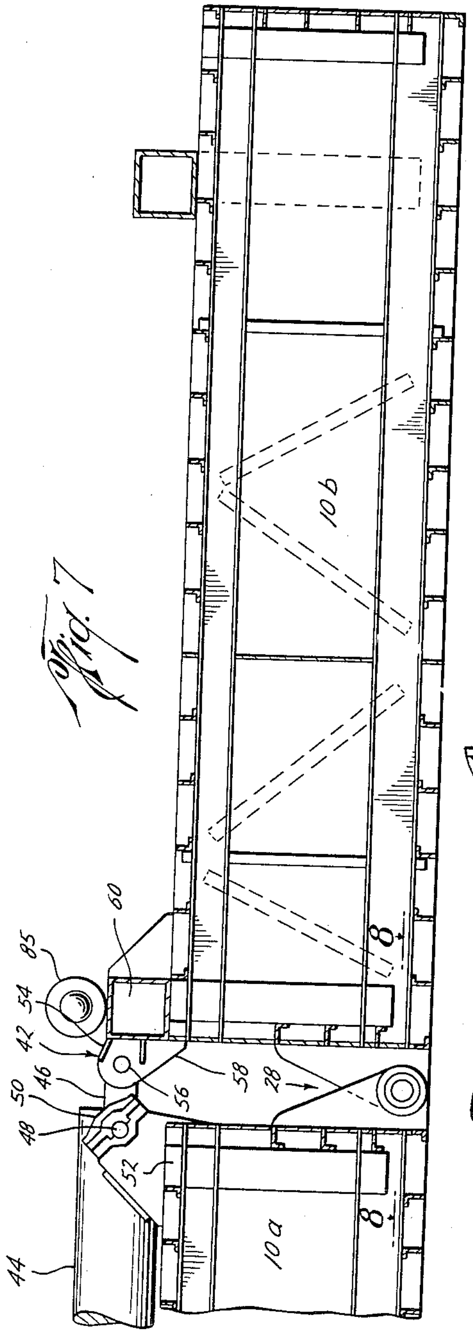
Figure 8:
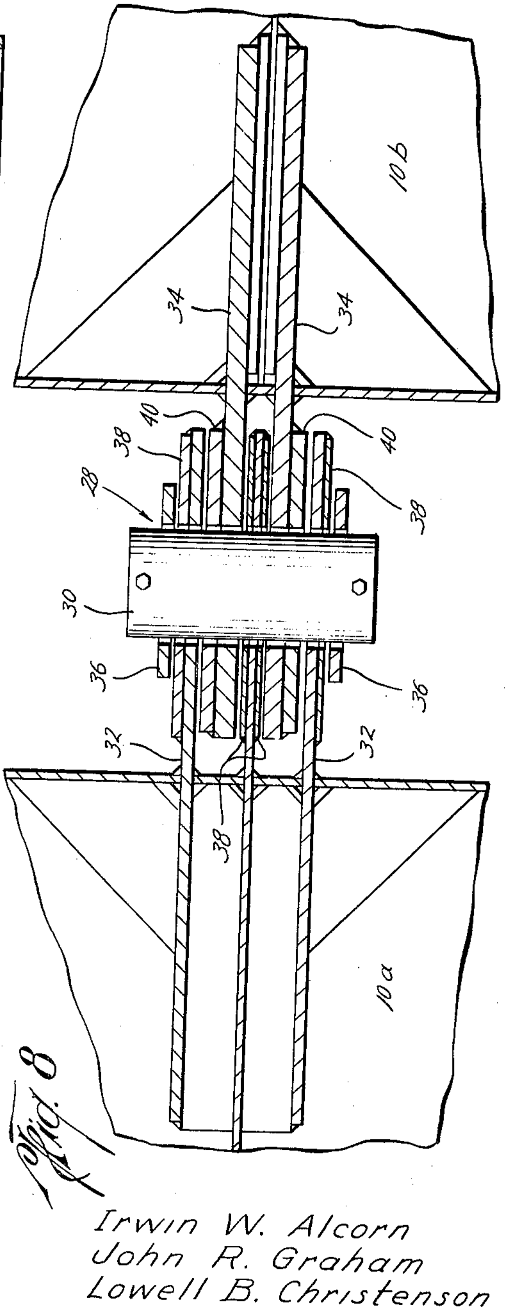
Figure 10:
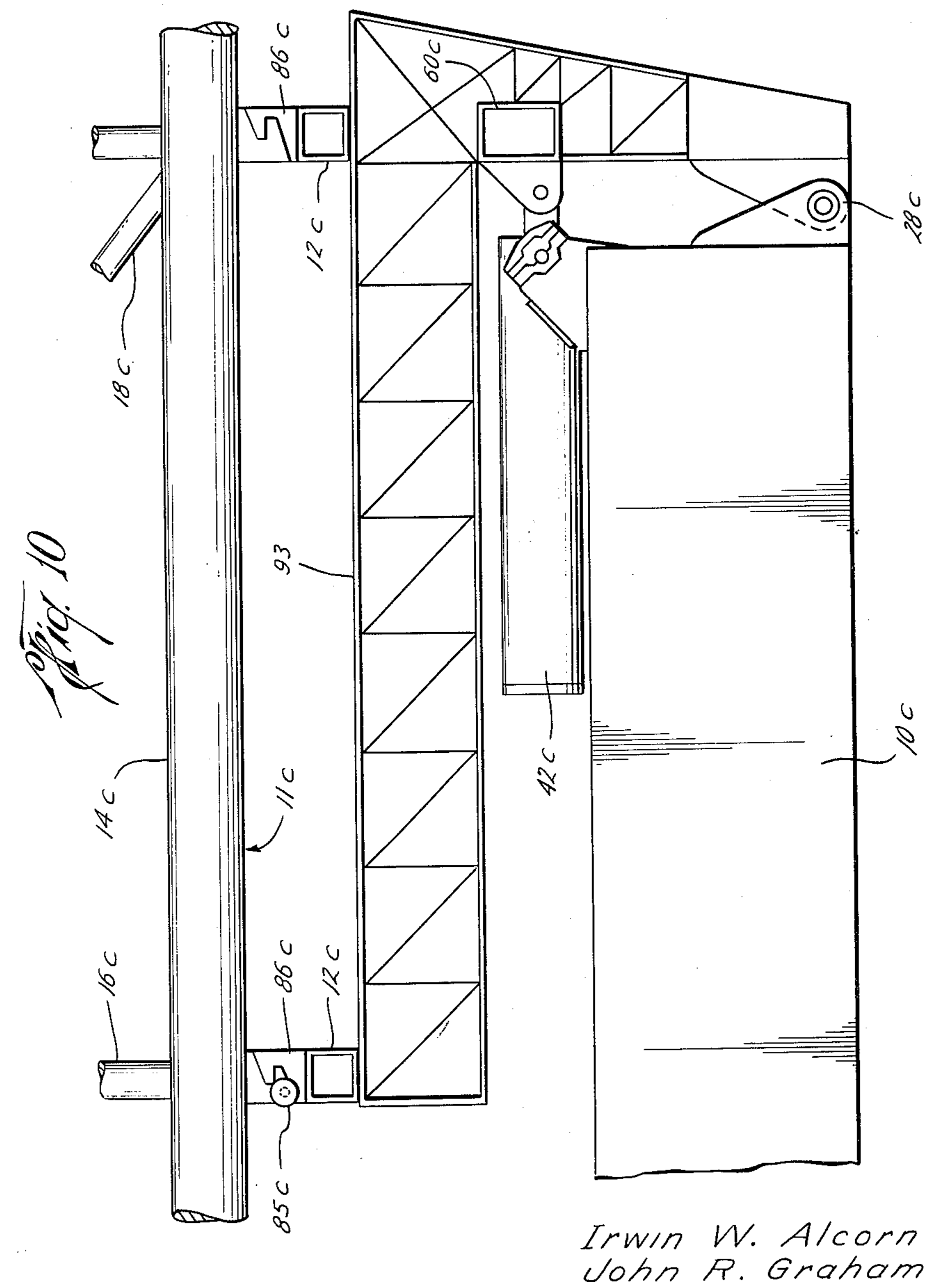
Figure 11:
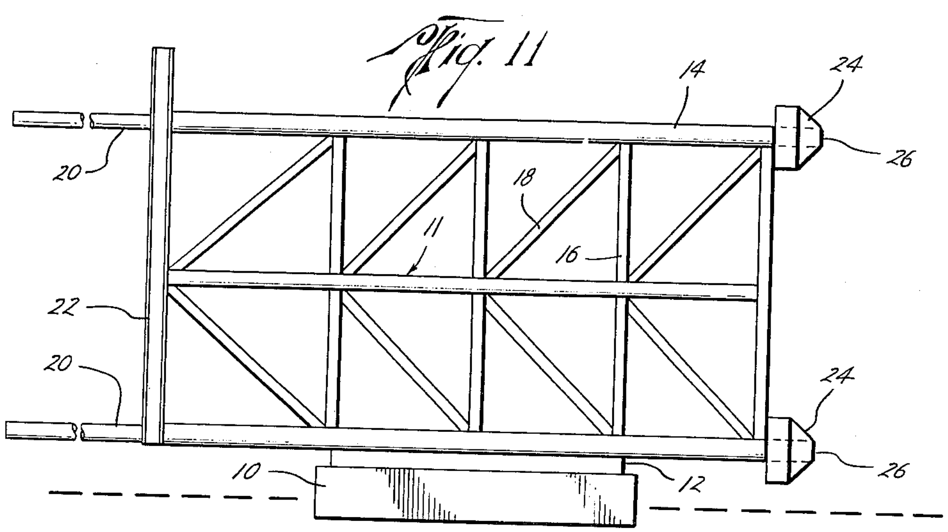
Figure 12:
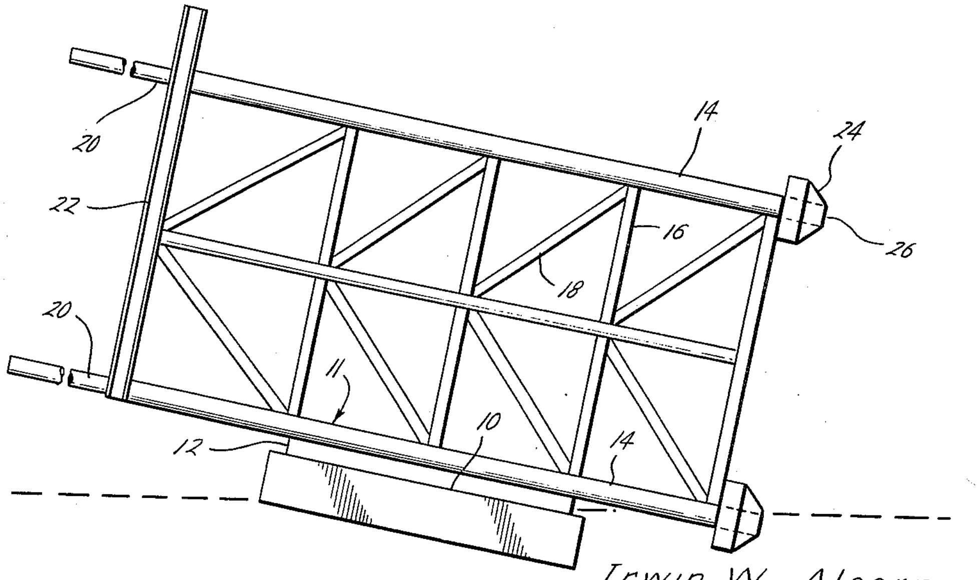
Figure 14:
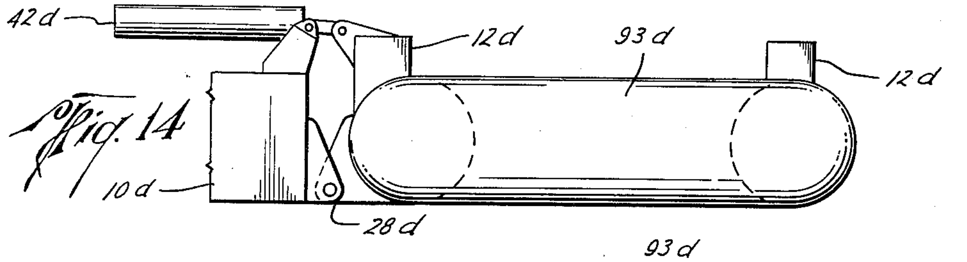
Figure 13:
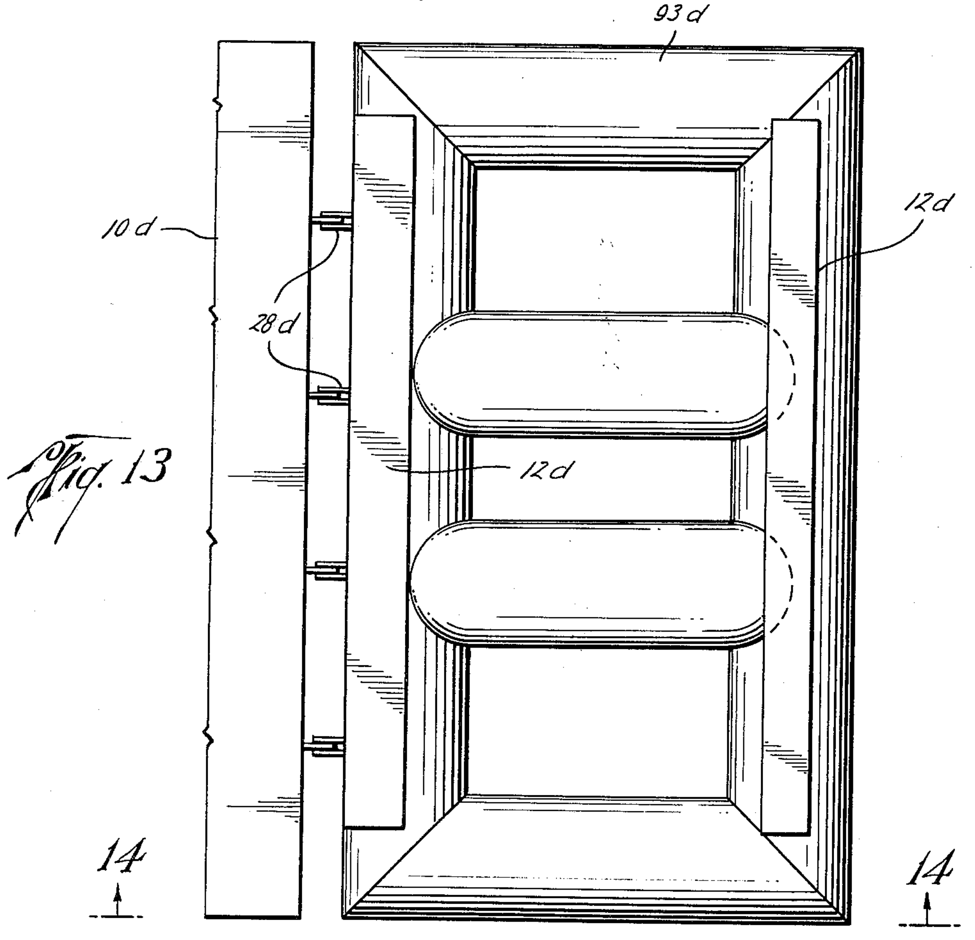

Other and further objects, features and advantages will be apparent from the following description of presently preferred examples of the invention, given for the purpose of disclosure, and taken in conjunction with the accompanying drawings in which like character references designate like parts throughout the several views, and where FIGURE 1 is a side elevation illustrating an offshore structure and launching and erecting means according to the invention shown floating the structure to location, FIGURE 2 is a view similar to that of FIGURE 1 but illustrates an intermediate point in erecting the offshore structure at location, FIGURE 3 is a view similar to that of FIGURE 1 illustrating the offshore structure in a vertical position for anchoring to the bottom of the body of water, FIGURE 4 is a view similar to that of FIGURE 1 illustrating the offshore structure anchored to the bottom of the body of water with the launching and erecting means disconnected, FIGURE 5 is a horizontal, sectional view taken along the line 5—5 of FIGURE 1, FIGURE 6 is a horizontal sectional view taken along the line 6—6 of FIGURE 1, FIGURE 7 is a fragmentary side elevation illustrating a hinge assembly between the barges, FIGURE 8 is a cross-sectional view taken along the line 8—8 of FIGURE 7, FIGURE 9 is a side view taken along the line 9—9 of FIGURE 6, FIGURE 10 is a side elevation illustrating a presently-preferred modification according to the invention for launching in very shallow depths of water, say ten to twenty feet, FIGURE 11 is a side elevational view illustrating a modification according to the invention, FIGURE 12 is a view similar to that of FIGURE 10 illustrating a step in the erection of the offshore structure, FIGURE 13 is a plan view of still a further modification according to the invention, and FIGURE 14 is a side view taken along the line 14—14 of FIGURE 13.

Before referring to the drawings, generally, the invention includes floating a substantially structurally complete offshore structure in a generally horizontal position to the desired location by means of one or more barges, then causing rotation of a barge, portions of the barges or launching elements of the barge so that the structure and barge or one of the barges or launching elements assume a generally vertical position until such time as the bottom of the structure bears on the bottom of the body of water, the structure then being released from the barge. Preferably, pilings are placed in the legs of the structure and the whole is floated to location so that the pilings may then be driven into bottom without any necessity of equipment for placing these pilings in the legs of the structure at location. Preferably, the legs of the platform structure are water tight in order to provide buoyancy to the structure in lowering it into a vertical position on the bottom of the water. Means are provided on the bottom of the legs for this purpose which are removed previous to driving the piling or are knocked out when the pilings are driven through. Additionally, means are provided for releasably securing the structure to the barge.

Referring now to FIGURES 11 and 12 of the drawings, the launching and erecting of an offshore structure according to the invention is illustrated in simplified form. Here a single barge 10 is provided having a support 12 for supporting an offshore structure 11 of the so-called jacket type which is provided with a number of vertical columns 14 and horizontal 16 and other bracing members 18. The vertical members 14 are hollow and water tight and preferably have the pilings 20 disposed therein when being floated to location. These pilings extend out the top or deck portion 22 of the jacket and extend downwardly into the foots 24 provided with the kick-out plates 26 at bottom which seal the bottoms of the columns 14 against entry of water therein.

Thus, the jacket structure is floated to location by means of the barge 10 and by ballasting the barge 10, the jacket structure is rotated in the direction illustrated in FIGURE 11 until such time as it assumes a vertical position with the foots 24 on bottom. The pilings 20 are then driven into place thus anchoring the jacket to bottom. The barge 10 may then be released from the jacket structure 11, although it may be released prior to the driving of the piles 20, if desired, and suitable equipment placed upon the deck 22 and other portions of the jacket 11 for drilling or other operations as desired.

The barge 10 includes compartments, ballast lines and the like, such as described later, so that the barge 10 may be rotated as described.

It is noted that the jacket or offshore structure 11 is substantially prefabricated with the pilings 20 in place and that erection construction at the point of location is held at a minimum.

Referring now to FIGURE 1, a pair of barges **10*a* and 10*b*, hinged together, as described later, support the offshore structure or jacket structure 11*a* by means of the supports or pedestals 12*a* on the barge 10*a* and the laterally extending supports 12*b* on the barge 10*b*. The jacket structure 11*a* has the structural bracing elements 16*a* and 18*a*, the water tight vertical members 14*a* having the pilings 20*a* in position therein, the foots 24*a* being provided at the lower ends of the vertical columns 14*a*, which foots are closed by the water tight plates 26*a*, the structure 11*a* being similar to that illustrated in FIGURES 10 and 11. A suitable deck 22*a*** is also provided for various elements which may be placed thereon to perform desired operations at offshore bases.

The barges **10*a* and 10*b* are hinged together, as at 28 at a plurality of points, as best seen in FIGURE 6, where four such hinges 28 are illustrated so that rotation between the two barges 10*a* and 10*b*** may take place.

Any suitable hinge may be utilized, and referring now to FIGURES 7 and 8, a satisfactory hinge assembly is illustrated which includes an axle or shaft 30 journaled in the interleaving hinge plates 32 and 34 welded or otherwise secured to the confronting faces of the barges **10*a* and 10*b*, respectively. The washers 36 are disposed on each side around the axle or hub 30 and the bearing plates 38 and 40 are welded or otherwise secured to the hinge plates 32 and 34, respectively. As mentioned previously, however, the hinge assembly 28** illustrated is presently preferred and is satisfactory, any desired hinge assembly or arrangement may be utilized.

At the upper end of the confronting faces of the barges **10*a* and 10*b* above the hinge assemblies 28 are provided a number of hydraulic actuators, generally designated by the reference numeral 42, which includes a hydraulic cylinder and piston therein, not shown, to which is connected the ram or piston rod 46. In order to simplify the disclosure, no detailed description of any particular hydraulic piston and cylinder arrangement and hydraulic system is set forth or is deemed necessary as any suitable one may be used. The cylinder 44, however, is pivoted by the pivot pin 48, the cap 50 and pivot support 52 secured to the forward and upper edge of the barge 10*a* to permit a swinging motion of the cylinder 44 during operation. Similarly, the ram 46 is pivotally secured by means of the pivot assembly 54 to the confronting upper end of the barge 10*b*, the pivot assembly 54 including the pivot pin 56 which is journaled in the pivot plates 58 secured by the structural element 60 to the barge 10*b***.

Thus, as the hydraulic actuator 44 is actuated, the cylinder 44 and ram 46 will pivot to accommodate the hinging action of the hinge assembly 28 between the barges **10*a* and 10*b***.

Referring now to FIGURE 6, the barges **10*a* and 10*b* are divided into a plurality of compartments 62 and 64, respectively, in order that the barges may be ballasted as desired during launching and erecting operations. In order to further simplify the disclosure, the details of the ballast pump, pump room generator, and the like have been eliminated, a control station 65 and pump room 67 are provided from which the ballast piping 66 extends to the compartments 62, and through the flexible connections 70 to the ballast piping 72 for the compartments 64. If desired, a swivel connection or other connection may be used for the flexible connection 70. Suitable pumps, connections and piping are provided so that these various compartments may be flooded or have water pumped out of them to assist in stabilizing the erection of the offshore structure 11*a*. To further assist in the ballasting operations, sea chests, such as those illustrated at 71** may be provided.

Man holes 78 are illustrated for the compartments 62 and 64, respectively, and the usual bitts 80 and cleats 83 are illustrated. In addition, the compartments 62 and 64 are vented, in the usual fashion, as indicated at 84 and 86, respectively.

As best seen in FIGURES 1, 2, 3 and 5 auxiliary pontoons 82 may be releasably secured to the upper or outer columns **14*a* of the jacket structure 11*a* which, along with the buoyancy in these columns, assist in the launching and erecting of the jacket structure 11*a***, when necessary or desirable.

In launching and erecting a jacket structure as illustrated in FIGURES 1–9, inclusive, the jacket structure 11*a* is placed on the barges 10*a* and 10*b* and supported by the pedestals 12*a* and supports 12*b* and floated to position as illustrated in FIGURE 1. A releasing connection 86 is provided, as seen in FIGURE 1, so that the jacket 11*a* may be released from the barge 10*b* when desired. Obviously, any suitable means may be provided for releasably securing the jacket structure 11*a* to the barges 10*a* and 10*b*, a hydraulically-actuated locking pin structure 85 is illustrated for this purpose, the details of which have been eliminated as unnecessary in order to further simplify the disclosure. Of course, any desired locking structure which may be released when desired may be used.

Prior to the erection operation, the requirements for ballasting the barges 10*a* and 10*b* will be determined. This depends upon the depth, the weight of the structure to be erected, its buoyancy and the like. These will vary and are determined by calculations, model tests and the like so that the hydraulic actuators or rams 42 will be subjected to pressures not exceeding their design limitations. A typical ballasting is indicated at 89 and 91 in FIGURES 1, 2 and 3.

On approaching the desired location or after reaching the same the ballasting is completed before the launching operation is commenced. The locking means 85 securing the jacket structure 11*a* to the barge 10*a* are then released and the hydraulic actuators 42 are actuated to permit the barge 10*b* to swing generally downwardly until a vertical position is reached as best seen in FIGURE 3.

When the position of FIGURE 3 is reached, the auxiliary pontoons 82 are released, as is barge 10*b*, the knock-out or kick-out plates 26*a* are knocked out and the pilings 20*a* are driven into the bottom 88 of the body of water 90.

It is highly desirable that the bottoms or foots 24*a* be bearing on the bottom 88 before releasing the barge 10*a* and auxiliary pontoons 82 for stability reasons. To this end, the compartments of barge 10*a* may be ballasted so that either end thereof may extend upwardly or downwardly as required for this purpose. Previous to the floating of the jacket structure to location, the depth is sounded so that the jacket structure 11*a* may be so placed on the barges 10*a* and 10*b* that by actuating the hydraulic rams and by proper ballasting, the bottoms or foots 24*a* will be on the bottom 88 prior to release of the structure so that control is exercised over the erection operation at all times.

In order to prevent the template structure from sinking down too much in soft soil, the mud mats 92 are provided at the bottom of the template 11*a*.

Once the pilings 20*a* have been driven, the platform may need to be leveled. This can be accomplished by hydraulic jacks, mechanical devices, and the like, not shown. At this time, the offshore structure 11*a* is secured to the pilings 20*a*, such as by welding, clamps and the like, not shown.

The piles 20*a* may advantageously be driven into the bottom 88 by means of a crane mounted on the usual drilling tender, not shown. Once the piling has been driven, the structure 11*a* leveled and the pilings 20*a* secured thereto, all machinery and equipment necessary for the operation to be accomplished may be placed on the structure deck 22*a* by the crane on the drilling tender.

In some areas, particularly where there is coral, drilling through the coral or other hard formations may advantageously be accomplished by drilling through the legs 14*a*. The pilings 20*a* may then be reinserted into the legs 20*a* and driven into the formation below the hard formation.

In the event it is desired to remove the jacket structure 11*a*, the operation is simply reversed in that the bottom of the pilings are removed, the connections 86 reconnected to the barge 10*a*, the pontoons 82 connected to the outer columns 14*a*, and the hydraulic rams actuated to return the template or jacket structure 11*a* to the position illustrated in FIGURE 1. The barges 10*a* and 10*b* and the jack structure 11*a* may then be moved to another location and there erected as previously described.

Turning now to FIGURE 10, a further modification is illustrated for relatively shallow depths of water, for example, for about ten to twenty feet. The reference letter "*c*" has been added to the numerals referring to parts corresponding to those of the other figures. In this figure, a truss arm 93 is connected by the hinge 28*c* and hydraulic ram or actuator 42*c* to the barge 10*c*. While only one truss arm 93 is shown, preferably a plurality of these are provided in the same manner. The truss arms 93 thus serve as the launching barge 10*b* and are operated in the manner previously described. All other parts and details are the same as previously described, and no further description thereof is deemed necessary. Thus, the truss arms 93 releasably support and launch and erect the structure 11*c* in place of the launching barge 10*b*.

Referring now to FIGURES 13 and 14 a further modification is illustrated. Here the reference letter "*d*" is added to parts corresponding to those in the other figures. The principal change here is that the launching barge 93*d* is in the form of an open structure made up of tubular elements so that a minimum surface is provided when rotating the launching barge to vertical position when erecting the offshore structure. All other parts are the same and no further description is deemed necessary. The open type launching structure 93*d* may be ballasted or not, as required or desired.

Thus, any type launching assembly may be hingedly secured to the barge for launching an offshore structure under a variety of conditions.

It is believed that the method of the invention has been described in connection with the apparatus of the invention. By way of recapitulation, however, the method includes floating an offshore structure to location on one or more barges, rotating the structure to a generally vertical position and having the bottom thereof bear on the bottom of the body of water, releasing the structure from the barge and anchoring the structure to the bottom of the body of water. Preferably, the method contemplates having pilings in place in vertical water tight columns of the structure so that when the bottoms of these columns bear on the bottom of the body of water, the pilings may be driven into the bottom by suitable auxiliary equipment.

The method also contemplates resecuring the structure to one of the barges or a portion thereof, removing the anchoring elements, such as the pilings driven into the bottom of the body of water, rotating the offshore structure from a generally vertical position to a horizontal position on the barge or barges and floating it to a new location.

The present invention, therefore, is well adapted and suited to attain the objects and ends and has the advantages and features mentioned as well as others inherent therein.

While only presently preferred examples of the invention has been given for the purpose of disclosure, numerous changes in details, arrangement of parts and steps of the process will readily occur to those skilled in the art which are encompassed within the spirit of the invention as defined by the scope of the appended claims.

What is claimed is:

1. An offshore launching and erecting assembly for releasably and horizontally supporting and transporting an offshore structure to a desired location and erecting the offshore structure in a vertical position comprising, a pair of floating barges, one of said barges being smaller than the other barge, rotatable hinge means connecting inner ends of the barges and so arranged to permit downward movement of the outer ends of the said barges relative to each other, means on the barges for supporting the offshore structure in a generally horizontal position with the bottom end of said offshore structure being positioned adjacent the outer end of the smaller barge, a water holding compartment in the outer end of said smaller barge, means for flooding said water compartment for submerging said outer end of the smaller barge, and means for rotating the barges on said hinge means whereby the outer end of the smaller barge is directed downwardly thereby directing the bottom portion of the offshore structure downwardly.

2. The invention of claim 1 wherein the rotating means includes a hydraulic ram.

3. An offshore launching and erecting assembly for horizontally supporting and transporting an offshore drilling structure to a desired location and there erecting the offshore structure in a vertical position comprising, a pair of floating barges, said barges having water ballasting compartments generally dividing said barges into outboard and inboard water holding compartments, rotatable hinge means connecting said inboard compartments of said barges and so arranged to permit downward movement of said outboard portions of said barges relative to one another, means for admitting water to said outboard compartments, support means on the barges adapted to support an offshore structure in a generally horizontal position with the lower end of said offshore structure adjacent one of said outboard compartments whereby when said one outboard compartment is ballasted with water and submerged the bottom of the offshore structure is also directed downwardly.

4. The invention of claim 3 including means connected between the barges controlling the rotation of the barges on the hinge means.

5. A method of launching and erecting an offshore structure comprising, floating the offshore structure to location in a generally horizontal position and supported on a pair of floating barges, said barges being hinged adjacent their inner ends permitting one of said barges to be directed downwardly, releasably securing the lower end of the offshore structure to the outer end of one of the barges, flooding and submerging said outer end thereby rotating the offshore structure to a generally vertical position, controlling the rotation of the downward movement of said offshore structure, and disconnecting the offshore structure from said ballasted barge.

6. A method of launching and erecting an offshore structure comprising, floating the offshore structure to location in a generally horizontal position on a pair of floating barges, said barges being hingedly connected adjacent their first ends thereby permitting the second end of the first of said barges to be directed downwardly, supporting and releasably securing the lower end of the offshore structure to the second end of the first barge, flooding and submerging said second end of the first barge thereby rotating said second barge and the offshore structure to a generally vertical position, controlling the rotation of the downward movement of said offshore structure, ballasting the second end of the second barge to stabilize said second barge when the first barge is being flooded and submerged, and disconnecting the offshore structure from the second barge.

References Cited in the file of this patent

UNITED STATES PATENTS

| | | |
|---|---|---|
| 278,829 | Stierle | June 5, 1883 |
| 933,657 | Mitchell | Sept. 7, 1909 |
| 1,675,607 | Henry | July 3, 1928 |
| 2,422,168 | Kirby | June 10, 1947 |
| 2,525,955 | Scott | Oct. 17, 1950 |
| 2,552,899 | Manes | May 15, 1951 |
| 2,576,928 | Engstrand | Dec. 4, 1951 |
| 2,581,098 | Guenzel | Jan. 1, 1952 |
| 2,586,966 | Kuss | Feb. 26, 1952 |
| 2,591,225 | Wilson | Apr. 1, 1952 |
| 2,598,088 | Wilson | May 27, 1952 |
| 2,598,329 | Wilson | May 27, 1952 |
| 2,602,636 | Travers | July 8, 1952 |
| 2,608,829 | Knapp | Sept. 2, 1952 |
| 2,658,353 | Trexel | Nov. 10, 1953 |
| 2,817,212 | Stubbs | Dec. 24, 1957 |
| 2,846,851 | Pelham | Aug. 12, 1958 |
| 2,909,900 | Suderow | Oct. 27, 1959 |
| 2,921,442 | Laborde et al. | Jan. 19, 1960 |

FOREIGN PATENTS

| | | |
|---|---|---|
| 549,173 | Italy | Oct. 6, 1956 |
| 782,858 | Great Britain | Sept. 11, 1957 |